Oct. 15, 1946.  W. F. MacGREGOR  2,409,292
STATIONARY CONCAVE SCREEN
Original Filed Feb. 12, 1940

INVENTOR.
WALLACE F. MACGREGOR, DECEASED,
RICHARD D. MILLER, SPECIAL ADMINISTRATOR,
BY
Emerson B Donnell
ATTORNEY.

Patented Oct. 15, 1946

2,409,292

UNITED STATES PATENT OFFICE 2,409,292

STATIONARY CONCAVE SCREEN

Wallace F. MacGregor, deceased, late of Racine, Wis., by Richard D. Miller, special administrator, Racine, Wis., assignor to J. I. Case Company, Racine, Wis., a corporation Original application February 12, 1940, Serial No. 318,504. Divided and this application July 22, 1944, Serial No. 546,078

3 Claims. (Cl. 209—283)

The present invention relates to combination harvester threshers commonly known as "combines," and particularly to the general purpose type adapted for harvesting grain, beans, peas, and other crop growths, and which combine may be readily transported and operated by a tractor, and an object of the invention is to generally improve the construction and operation of devices of this class, the present application being a division of applicant's co-pending application, Serial 318,504, filed February 12, 1940, now Patent No. 2,354,346, July 25, 1944.

A further object is to provide a machine of this character limited in size and capable of efficient operation with a minimum of manual attendance.

A further object is the improved means for eliminating undesirable seeds from the cleaned grain.

Other objects and advantages will be apparent from the attached specification and accompanying drawing in which.

Figure 1:
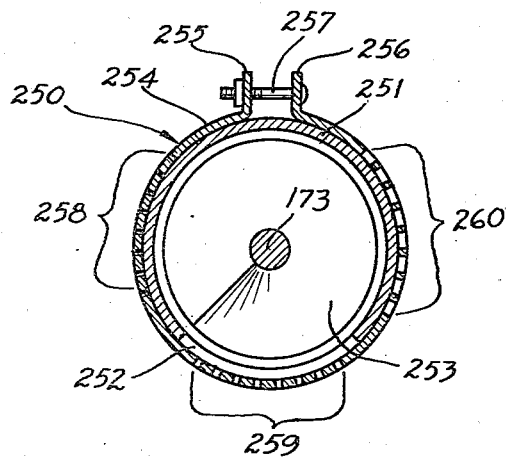
Figure 1 is a sectional view taken on the line 1—1 of Fig. 2.
Figure 2:
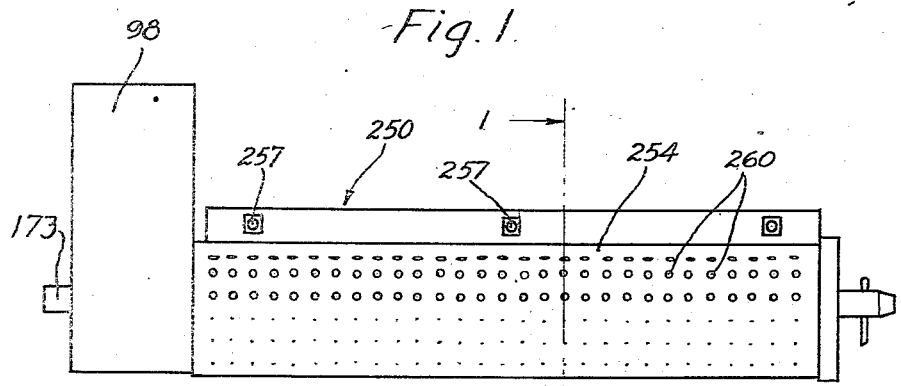
Fig. 2 is an elevation of a weed screen attachment.
Figure 2:
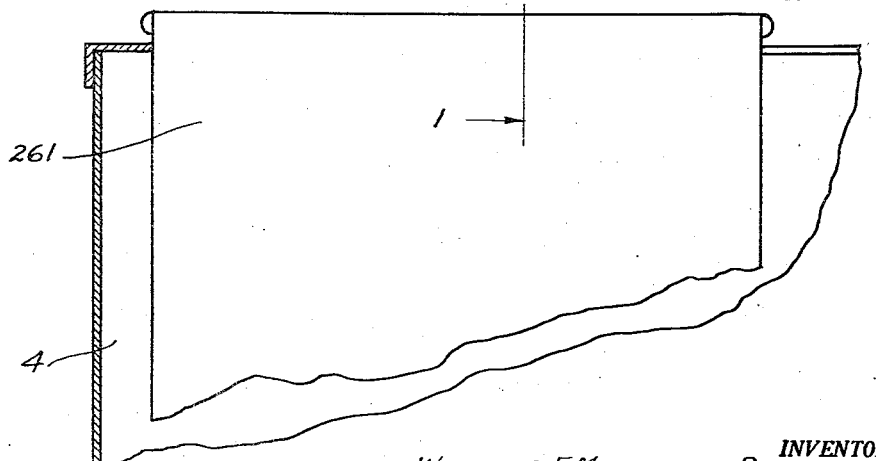

As seen in Fig. 2, the combine includes a bin 4 for receiving the harvested and cleaned grain, the grain being delivered from the separating mechanism not shown, by an elevator of conventional construction terminating in housing 98, through which passes a shaft 173. The grain is then transported through a housing 251, Fig. 1, having an opening 252, in the present instance by means of an auger 253 mounted on shaft 173. Auger 253 and its housing 251 are generally designated as 250 and serve to transport the grain from elevator 98 partially across bin 4 so that the grain deposited in the bin will be properly distributed.

The assemblage in addition to this function is adapted to remove undesirable seeds from the cleaned grain. For this purpose, the perforated sleeve or shroud 254 encloses housing or tube 251 and is preferably, although not necessarily arranged to be clamped thereabout as by flanges 255 and 256 which may be forced toward each other as by bolts 257—257. Sleeve 254 may have a plurality of sets of perforations 258, 259 and 260, any one of which may be brought into register with opening 252 by rotating the sleeve about tube 251. The perforations may be of several sizes whereby they may be adapted to pass the weed seeds but not the grain being harvested. A receptacle 261 of any suitable form is secured within bin 4 beneath tube 251 to collect the seeds and prevent their mixing with the clean grain. In this way the seeds may be separated from the grain with the addition of very little mechanism over that already on the combine.

Shaft 173 may be driven in any suitable manner, in the present instance by the elevator in housing 98, and it is to be understood that well-known expedients not shown are provided for supporting the several parts in the relations shown.

The above being a complete description of an illustrative embodiment of the invention, what is claimed as new and desired to be secured by Letters Patent of the United States is:

1. In a weed screen, the combination of a tubular housing extending in a substantially horizontal direction, a conveyor auger in the housing and disposed to propel grain containing undesirable particles through said housing from end to end thereof by virtue of rotation of said conveyor auger, said housing providing an opening in the bottom wall thereof, a sleeve disposed about said housing so as to cover said opening, said sleeve providing a plurality of sets of screening perforations of different sizes registerable with said opening as desired by rotation of said sleeve on said housing, said sleeve being split lengthwise, flanges extending along the margins of the split in said sleeve and means for forcing the flanges toward each other for clamping the sleeve in place on the housing, said sleeve being freely rotatable on the housing when the clamping means is loose, and a receptacle disposed beneath said opening for receiving particles screened from the grain through said perforations.

2. In a weed screen, the combination of a tubular housing extending in a substantially horizontal direction, a conveyor auger in the housing and disposed to propel grain containing undesirable particles through said housing from end to end thereof by virtue of rotation of said conveyor auger, said housing providing an opening in the bottom wall thereof, a sleeve disposed about said housing so as to cover said opening, said sleeve providing a plurality of sets of screening perforations of different sizes registerable with said opening as desired by rotation of said sleeve on said housing, means for clamping the sleeve in place on the housing, said sleeve being freely rotatable on the housing when the clamping means is loose, and a receptacle disposed beneath said opening for receiving particles screened from the grain through said perforations.

3. In a weed screen, the combination of a tubular housing extending in a substantially horizontal direction, a conveyor auger in the housing and disposed to propel grain containing undesirable particles through said housing by virtue of rotation of said conveyor auger, said housing providing an opening in the bottom wall thereof, a sleeve disposed about said housing so as to cover said opening, said sleeve providing a plurality of sets of screening perforations of different sizes registerable with said opening as desired by shifting of said sleeve on said housing, means for securing the sleeve in place on the housing, said sleeve being freely shiftable on the housing except when the securing means is operative, and a receptacle disposed beneath said opening for receiving particles screened from the grain through said perforations.

RICHARD D. MILLER,
*Special Administrator of the Estate of Wallace F. MacGregor, Deceased.*